US012754891B1

(12) United States Patent
Jacik et al.

(10) Patent No.: US 12,754,891 B1
(45) Date of Patent: Oct. 6, 2026

(54) UNIVERSAL INTELLIGENT RECOGNITION, IDENTIFICATION, AND CLASSIFICATION OF AI-PROCESSED BINARY LARGE OBJECTS USING A COMPUTABLE FORMAL GRAMMAR

(71) Applicant: Brillient Corporation, Reston, VA (US)

(72) Inventors: Richard Jacik, Lansdowne, VA (US); Adam Brown, Kansas City, MO (US); Changxing Lu, Sterling, VA (US)

(73) Assignee: Brillient Corporation, Reston, VA (US)

( * ) Notice: Subject to any disclaimer, the term of this patent is extended or adjusted under 35 U.S.C. 154(b) by 0 days.

(21) Appl. No.: 19/419,899

(22) Filed: Dec. 15, 2025

(51) Int. Cl.
*G06F 16/00* (2019.01)
*G06F 16/22* (2019.01)
*G06F 16/28* (2019.01)

(52) U.S. Cl.
CPC ........ *G06F 16/2219* (2019.01); *G06F 16/285* (2019.01)

(58) Field of Classification Search
None
See application file for complete search history.

(56) References Cited

U.S. PATENT DOCUMENTS 8,488,877 B1 * 7/2013 Owechko ............... G06V 20/64 382/165
2022/0229998 A1 * 7/2022 Naboka ................. G06F 40/284

FOREIGN PATENT DOCUMENTS

WO WO-2024155584 A1 * 7/2024 ............... G06N 7/01

* cited by examiner

*Primary Examiner* — Tuankhanh D Phan
(74) *Attorney, Agent, or Firm* — Auito IP Law, PLLC

(57) ABSTRACT

Methods and systems for classifying binary large objects (BLOBs) are disclosed. The system receives a BLOB, detects objects within it, and determines data coordinates and attributes for each object by analyzing only relevant portions of the BLOB. An object recognition grammar (ORG)-compliant representation is generated, encoding object types and their spatial and logical relationships. This representation is matched against an indexed data repository of known BLOB types for rapid and accurate classification. The method addresses technical problems, including inefficiency, brittleness to structural variation, and lack of verifiability, by leveraging structure-first analysis and a formal grammar to enable robust, auditable, and compute-efficient automated classification of digital media.

21 Claims, 3 Drawing Sheets

UNIVERSAL INTELLIGENT RECOGNITION, IDENTIFICATION, AND CLASSIFICATION OF AI-PROCESSED BINARY LARGE OBJECTS USING A COMPUTABLE FORMAL GRAMMAR

TECHNICAL FIELD

The present disclosure relates generally to data file classification. More specifically, in some embodiments, the present disclosure relates to systems and methods for universal intelligent recognition, identification, and classification of artificial intelligence (AI)-processed binary large objects using a computable formal grammar.

BACKGROUND

The proliferation of digital media and the increasing reliance on artificial intelligence (AI) for processing and managing such media have led to the widespread use of binary large objects (BLOBs) in a variety of applications. BLOBs, which may include scanned documents, images, audio and video files, and other complex data types, are commonly encountered in enterprise, governmental, and regulated environments. The accurate identification and classification of these BLOBs is essential for downstream processing, compliance, and automation.

Traditional systems for classifying and managing digital media have typically relied on a combination of pixel-based template matching, file metadata analysis, and keyword searches. These approaches are often fragile, as they depend on superficial characteristics such as file extensions or exact pixel arrangements, making them susceptible to errors when files are mislabeled, templates are revised, or minor variations occur in the data. Furthermore, such methods are generally unable to discern the true internal structure or provenance of a BLOB, limiting their effectiveness in complex or dynamic environments.

To address the limitations of these approaches, some systems employ content-based techniques such as full optical character recognition (OCR) or brute-force comparison algorithms. While these methods can provide deeper insights into the content of a BLOB, they are computationally expensive and often inefficient, especially when applied indiscriminately to large volumes of data. Additionally, machine learning models used for classification may lack transparency and auditability, making it difficult to validate their decisions or adapt to new object types without extensive retraining.

As the volume and diversity of digital media continue to grow, there is an increasing need for more robust, efficient, and explainable systems for the recognition, identification, and classification of BLOBs. Such systems must be capable of handling variability in data, supporting rapid adaptation to new formats, and providing verifiable results suitable for regulated and automated environments.

SUMMARY

This disclosure encompasses the recognition that previous technology for classifying digital data suffers from various technological problems and disadvantages, including those described above. For example, previous technology suffered from problems related to an over-reliance on fragile, superficial heuristics such as pixel-based template matching and unreliable metadata, and the inefficiency of content-first analysis methods like full-document OCR. This disclosure provides technical solutions to these and other problems of previous technology, as summarized below.

As a first example, conventional systems for classifying digital media such as scanned forms, images, and documents are fundamentally limited by their reliance on low-level artifact analysis, such as pixel-based template matching or superficial metadata inspection. These approaches are brittle, failing with minor changes in scale, rotation, or template revision, and are unable to discern the true structure or identity of a document. The disclosed technology addresses this problem by introducing a formal object recognition grammar (ORG) that enables the system to define and interpret high-level, context-sensitive computable rules governing the structure and relationships of objects detected within a BLOB. Using this ORG, the system can robustly and efficiently recognize and classify BLOBs based on their logical structure, rather than fragile surface features, thereby providing reliable identification even in the presence of document variations.

As a second example, prior technology typically required computationally expensive operations such as full OCR or exhaustive content analysis to attempt to classify documents, leading to inefficiency and high resource consumption. This disclosure recognizes that these methods are not only slow but also misdirected, as they focus on content rather than the macro-layout and structural features that are indicative of the identity of a document or other data type. Embodiments of the present disclosure solve this problem by implementing a structure-first analysis approach, whereby the system rapidly performs an efficient detection and analysis of relevant objects to detect and interpret the structure and layout of the BLOB before resorting to any costly content analysis like full file OCR or the like. This approach minimizes or eliminates the need for full OCR or other resource-intensive tools, enabling rapid classification with significantly reduced computational overhead.

As a third example, existing machine learning-based classification systems are often opaque, producing non-deterministic and non-repeatable results that lack explainability and auditability. This is particularly problematic in regulated environments where verifiable accuracy and transparent decision-making are required. Embodiments of the disclosed technology overcome this limitation by employing a shared, human- and machine-readable formal grammar to define object structures, allowing both humans and computers to validate classification decisions against clear, logical rules. This transparency ensures that the classification process is fully auditable and that the rationale for each decision can be readily understood and verified.

As a fourth example, traditional classification technologies struggle to adapt to new or revised document types, often requiring costly retraining of machine learning models or manual reconfiguration of templates. This inflexibility hampers scalability and responsiveness to evolving data formats. Embodiments of the present disclosure address this challenge by maintaining an object recognition grammar object repository (ORGOR) that stores indexed object definitions and supports rapid retrieval and refinement. When new or revised objects are encountered, the system can escalate analysis using additional object detection information and update the repository through autonomous or application-driven reinforcement learning, enabling efficient adaptation without the need for extensive retraining.

As a fifth example, the integration of multiple object detection utilities, ranging from deep learning models to rule-based and heuristic methods, has traditionally been complex and costly, with little coordination or optimization across different detection approaches. Embodiments of the present disclosure include detection orchestration utilities capable of seamlessly leveraging and orchestrating a diverse set of internal, external, and bespoke object detection services. By coordinating these utilities and synthesizing their outputs into ORG-compliant representations, embodiments of the system may ensure that only the necessary level of analysis is performed, escalating to more detailed or computationally intensive methods only when required to achieve a determinative match. This orchestration optimizes resource usage and enhances the accuracy and reliability of object recognition and classification.

In accordance with the above, in some embodiments, this disclosure is integrated into the practical application of a universal object recognition, identification, and classification system for BLOBs. The system addresses the limitations of conventional classification methods by employing a formal ORG to define objects in BLOBs based on their structure and the relational attributes of their components, rather than relying on fragile, content-based heuristics. This structure-first approach enables rapid, compute-efficient analysis by prioritizing a document's geometric layout, minimizing or eliminating the need for costly full-document OCR or other resource-intensive tools that analyze the full BLOB. Embodiments of the system orchestrate a variety of object detection utilities to identify objects and synthesize this information into an ORG-compliant representation, which is then compared against a repository of known object definitions. This improved approach provides verifiable, auditable results and supports autonomous deep learning to adapt to new or revised document types with minimal training data, overcoming the brittleness and high maintenance costs of traditional classification technologies.

In an aspect, the present disclosure provides a computer-implemented method comprising, by a processor: receiving data comprising a first binary large object; detecting, in the first binary large object, one or more objects; for each of the one or more detected objects, determining data coordinates within the first binary large object; for each of the one or more detected objects, determining, by applying a machine-implemented object characterization algorithm to a portion of the first binary large object defined by the data coordinates, attributes of the detected objects without applying the machine-implemented object characterization algorithm to the entire first binary large object, wherein the machine-implemented object characterization algorithm comprises at least one of an AI-based detection algorithm, a rule-based detection algorithm, or a hybrid AI-and-rule-based detection algorithm; generating, based on the detected objects, a representation of the first binary large object, wherein the representation is compliant with an object recognition grammar (ORG) and encodes at least one of a type of the detected objects, spatial relationships of the detected objects, and logical relationships of the detected objects; accessing an indexed data repository storing a plurality of indexed binary large object representations and using the indexed data repository to determine whether the generated representation matches a predefined representation for a known class of binary large objects; and, responsive to determining that the generated representation matches the predefined representation, classifying the first binary large object as an object from the known class of binary large objects.

In some embodiments, the first binary large object comprises an image file, a document file, an audio file, or a video file, and the representation is a tokenized, hierarchical structure based on the ORG. In some embodiments, detecting the objects comprises applying at least one of a machine learning model, a rule-based pattern matching algorithm, and a heuristic identification algorithm to the first binary large object to detect the objects. In some embodiments, determining the data coordinates of each of the one or more detected objects comprises identifying, for the object, a subset of data of the first binary large object that encodes a digital representation of a corresponding object in an analog presentation of the data at given spatial and/or temporal coordinates. In some embodiments, determining the attributes for each of the one or more detected objects comprises applying the machine-implemented object characterization algorithm only to the subset of data identified for the object without applying the machine-implemented object characterization algorithm to the entire first binary large object.

In some embodiments, generating the representation of the first binary large object comprises, for each detected object, determining an inferred identity and a characteristic description of the object based on the coordinates and/or the attributes of the object, generating a text string indicating the inferred identity and at least a portion of the characteristic description of the object, and arranging the generated text strings according to the ORG, wherein the arranged text strings are hierarchical and tokenized, supporting efficient parsing and comparison. In some embodiments, determining whether the generated representation matches a predefined representation for a known class of binary large objects comprises comparing the generated representation to a plurality of indexed binary large object representations in the indexed data repository using a machine-implemented comparison algorithm, and, based on the comparison, determining that the known class of binary large objects matches the generated representation and a confidence score for the match.

In some embodiments, the method further comprises receiving additional data comprising a second binary large object, generating a second representation of the second binary large object, wherein the second representation is compliant with the ORG, determining that the second generated representation does not match a predefined representation for a known class of binary large objects, and, responsive to determining that the second generated representation does not match a predefined representation for a known class of binary large objects, triggering a full machine-implemented analysis of an entirety of the second binary large object.

In some embodiments, the method further comprises determining a new predefined representation to include in the indexed data repository based on a set of training data by receiving the set of training data, the set of training data comprising a new binary large object and a known identity of the new binary large object, determining a new ORG-compliant representation for the new binary large object, and storing and indexing the new ORG-compliant representation and the known identity in the indexed data repository. In some embodiments, the method further comprises determining, based on a machine-implemented comparison of the new ORG-compliant representation to preexisting representations in the indexed data repository, that the new representation is similar to a preexisting representation, and linking via an index pointer, the new representation to the similar preexisting representation.

In some embodiments, the method further comprises generating a confidence score indicating a probability that the first binary large object was classified correctly as the object from the known class of binary large objects, and, responsive to determining the confidence score is below a threshold level, triggering review of the first binary large object. In some embodiments, the method further comprises receiving a correction to a classification of the first binary large object, and using the correction to automatically update the indexed repository to prevent a future misclassification of the first binary large object as the object from the known class of binary large objects, thereby facilitating ongoing classification improvement.

In another aspect, the present disclosure provides a system comprising a memory storing instructions and a processor coupled to the memory, wherein the processor is configured to: receive data comprising a first binary large object; detect, in the first binary large object, one or more objects; for each of the one or more detected objects, determine data coordinates within the first binary large object; for each of the one or more detected objects, determine, by applying a machine-implemented object characterization algorithm to a portion of the first binary large object defined by the data coordinates, attributes of the detected objects without applying the machine-implemented object characterization algorithm to the entire first binary large object; generate, based on the detected objects, a representation of the first binary large object, wherein the representation is compliant with an object recognition grammar (ORG) and encodes at least one of a type of the detected objects, spatial relationships of the detected objects, and logical relationships of the detected objects; access an indexed data repository storing a plurality of indexed binary large object representations and use the indexed data repository to determine whether the generated representation matches a predefined representation for a known class of binary large objects; and, responsive to determining that the generated representation matches the predefined representation, classify the first binary large object as an object from the known class of binary large objects.

In some embodiments, the first binary large object comprises an image file, a document file, an audio file, or a video file, and the representation is a tokenized, hierarchical structure based on the ORG. In some embodiments, the processor is configured to detect the objects by applying at least one of a machine learning model, a rule-based pattern matching algorithm, and a heuristic identification algorithm to the first binary large object to detect the objects. In some embodiments, the processor is configured to determine the data coordinates of each of the one or more detected objects by identifying, for the object, a subset of data of the first binary large object that encodes a digital representation of a corresponding object in an analog presentation of the data at given spatial and/or temporal coordinates, and to determine the attributes for each of the one or more detected objects by applying the machine-implemented object characterization algorithm only to the subset of data identified for the object without applying the machine-implemented object characterization algorithm to the entire first binary large object.

In some embodiments, the processor is configured to generate the representation of the first binary large object by, for each detected object, determining an inferred identity and a characteristic description of the object based on the coordinates and/or the attributes of the object, generating a text string indicating the inferred identity and at least a portion of the characteristic description of the object, and arranging the generated text strings according to the ORG, wherein the arranged text strings are hierarchical and tokenized, supporting efficient parsing and comparison. In some embodiments, the processor is configured to determine whether the generated representation matches a predefined representation for a known class of binary large objects by comparing the generated representation to a plurality of indexed binary large object representations in the indexed data repository using a machine-implemented comparison algorithm, and, based on the comparison, determining that the known class of binary large objects matches the generated representation and a confidence score for the match.

In some embodiments, the processor is configured to receive additional data comprising a second binary large object, generate a second representation of the second binary large object, wherein the second representation is compliant with the ORG, determine that the second generated representation does not match a predefined representation for a known class of binary large objects, and, responsive to determining that the second generated representation does not match a predefined representation for a known class of binary large objects, trigger a full machine-implemented analysis of an entirety of the second binary large object.

In some embodiments, the processor is configured to determine a new predefined representation to include in the indexed data repository based on a set of training data by receiving the set of training data, the set of training data comprising a new binary large object and a known identity of the new binary large object, determining a new ORG-compliant representation for the new binary large object, and storing and indexing the new ORG-compliant representation and the known identity in the indexed data repository; determining, based on a machine-implemented comparison of the new ORG-compliant representation to preexisting representations in the indexed data repository, that the new representation is similar to a preexisting representation; and linking via an index pointer, the new representation to the similar preexisting representation.

In some embodiments, the processor is configured to generate a confidence score indicating a probability that the first binary large object was classified correctly as the object from the known class of binary large objects, and, responsive to determining the confidence score is below a threshold level, trigger review of the first binary large object. In some embodiments, the processor is configured to receive a correction to a classification of the first binary large object, and use the correction to automatically update the indexed repository to prevent a future misclassification of the first binary large object as the object from the known class of binary large objects, thereby facilitating ongoing classification improvement.

In another aspect, the present disclosure provides a non-transitory computer-readable storage medium containing program instructions for causing a processor to perform a method comprising steps of: by a processor, receiving data comprising a first binary large object; detecting, in the first binary large object, one or more objects; for each of the one or more detected objects, determining data coordinates within the first binary large object; for each of the one or more detected objects, determining, by applying a machine-implemented object characterization algorithm to a portion of the first binary large object defined by the data coordinates, attributes of the detected objects without applying the machine-implemented object characterization algorithm to the entire first binary large object, wherein the machine-implemented object characterization algorithm comprises at least one of an AI-based detection algorithm, a rule-based detection algorithm, or a hybrid AI-and-rule-based detection algorithm; generating, based on the detected objects, a representation of the first binary large object, wherein the representation is compliant with an object recognition grammar (ORG) and encodes at least one of a type of the detected objects, spatial relationships of the detected objects, and logical relationships of the detected objects; accessing an indexed data repository storing a plurality of indexed binary large object representations and using the indexed data repository to determine whether the generated representation matches a predefined representation for a known class of binary large objects; and, responsive to determining that the generated representation matches the predefined representation, classifying the first binary large object as an object from the known class of binary large objects.

BRIEF DESCRIPTION OF DRAWINGS

The present system is illustrated by way of example and is not limited by the figures of the accompanying drawings in which like references indicate similar elements.

DETAILED DESCRIPTION

Figure 1:
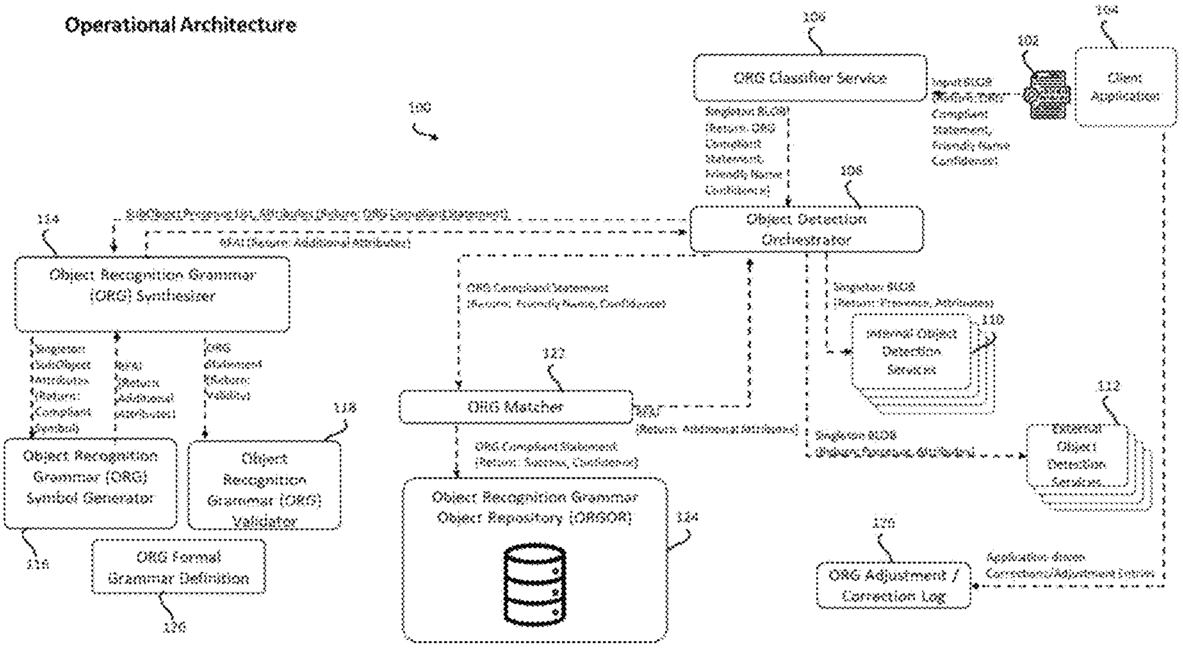
FIG. 1 is a system-level diagram of a classification system as operated during data classification, according to embodiments of this disclosure.

The following detailed description makes references to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. The following detailed description is therefore not to be taken in a limiting sense, and the scope of the present disclosure is defined by the appended claims and their equivalents.

As described above, previous technology for classifying data stored in the form of BLOBs, such as digital media files or other binary data, suffer from various problems. As an example, digital media, from scanned forms to office documents, suffer from fundamental architectural limitations. These deficiencies result in high error rates, inefficiency (including exorbitant use of compute resources) and a lack of the necessary verifiability for regulated or automated environments.

Previous technology for classifying such data has a reliance on superficial and fragile heuristics. One previous approach to classifying a scanned form or document relies on pixel-based template matching. However, this method is known to fail catastrophically with minor variances in scale, rotation, or form template revision. Its reliance on a rigid, one-to-one pixel correspondence is unworkable for variable, real-world applications. Previous methods are also susceptible to errors resulting from unreliable file metadata and keyword analysis. For example, systems that depend on file extensions (e.g., .pdf, .docx) or keyword searches are fundamentally flawed. These approaches are easily broken by mislabeled files, causing downstream process failures. More critically, these approaches are blind to a file's provenance and true internal structure. For example, these approaches cannot distinguish a PDF generated from a text-and-vector-based source (like a PowerPoint slide) from a PDF that is merely a wrapper for a single raster image (like a JPEG), even though their underlying data, intended use, and appropriate handling may be completely different.

Previous technology was also inefficient because of reliance on an inadaptable content-first analysis approach. For example, previous technology for evaluating scanned forms or documents has an over-reliance on full form/document OCR. This disclosure recognizes that performing OCR on an entire document for classification is computationally expensive and misdirected. This approach incorrectly assumes identity is defined by textual content, ignoring the primary identifying features of macro-layout and structure. This approach also fails to adapt to document revisions. Previous technology particularly cannot efficiently adapt to form template revisions or template updates. Instead, machine learning models require costly retraining, and template systems must be manually rebuilt.

Previous technology also suffers from the use of opaque models that are not easily auditable or extensible. For instance, many machine learning models act as black box classifiers and cannot provide a human-readable, deterministic rationale for a decision. This opacity prevents the necessary auditing and validation required in legal, financial, and government sectors. Furthermore, many AI systems produce non-deterministic and probabilistic outputs that are not guaranteed to be 100% repeatable, introducing a level of unreliability that is unacceptable for mission-critical functions where verifiable accuracy is required. In a dynamic environment, these systems are inflexible, as any new object types require an expensive retraining of the AI model, even if the changes are insubstantial and can be easily described by a human.

Previous technology also presents cost-prohibitive barriers for ongoing training and analysis of results. Combining results from multiple conventional methods introduces complexity and ambiguity that is challenging to maintain and costly to implement. Without a strategic approach that progressively analyzes content, each method accumulates both financial and computational expense. Furthermore, the training dataset is typically required to grow in quantity and complexity to handle new inputs.

Previous technology also typically employs human verification methods that are not generalized. Although manual data corrections can influence the development of more accurate algorithms and machine-learning models, both approaches require manual intervention. Neither approach uses prior inferences and content similarity to intelligently identify new classification categories.

This disclosure recognizes that a core deficiency of the previous technology is the absence of a formal structural grammar. Previous systems are limited to analyzing low-level artifacts (e.g., pixels, characters detected via OCR) but are fundamentally incapable of comprehending the set of high-level, relational rules that constitute a document's true and verifiable identity. These systems cannot process logical definitions like "a signature must overlay a line" or "the title must be the largest font element." This forces these systems into a permanent and unsolvable cycle of brittle, inefficient, and opaque guesswork, since a mechanism is lacking to validate a BLOB against a concrete, logical blueprint of what it is supposed to be.

Figure 2:
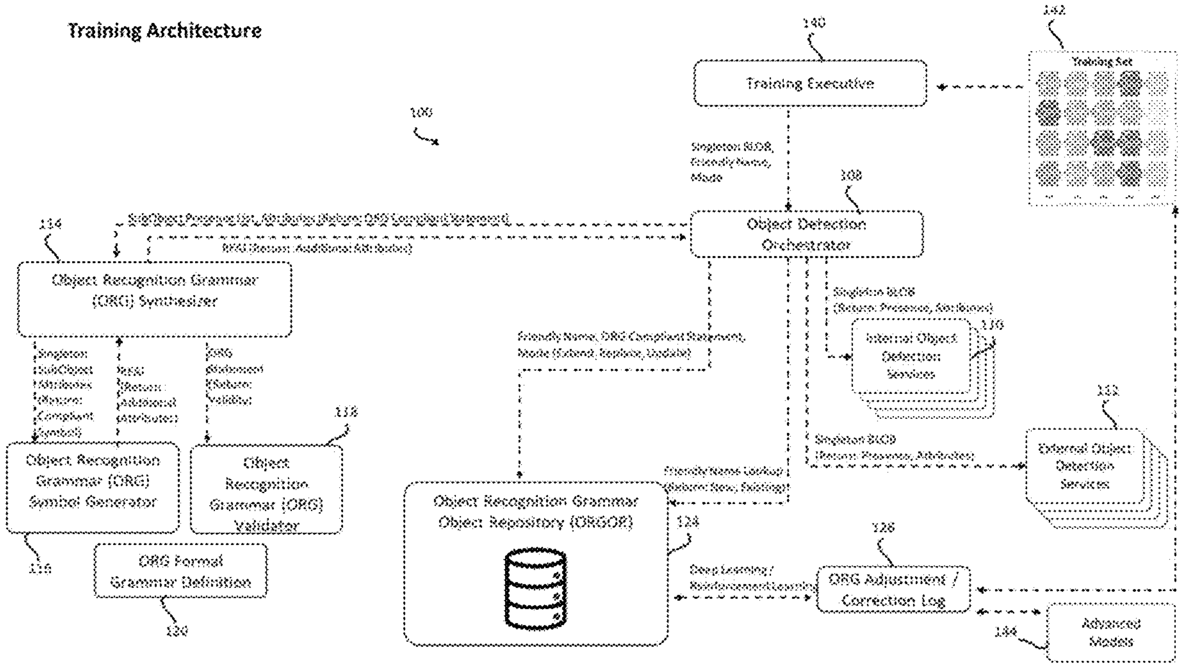
FIG. 2 is a system-level diagram of the system of FIG. 1 as operated during training, according to embodiments of this disclosure.

FIGS. 1 and 2 illustrates an exemplary architecture of a classification system 100 that solves problems of previous technology, including those described above. FIG. 1 shows the system 100 during its operation to classify a BLOB 102. Training of the system 100 is described with respect to FIG. 2. The system 100 is a compute-efficient and universally applicable object recognition, identification, and classification system that optimally identifies and classifies BLOBs 102 by interpreting the structure and embedded objects (also referred to as "SubObjects") using a dictionary of object definitions stored in an object recognition grammar object repository (ORGOR) 124. Embodiments of the system 100 support least-compare token matching so that exhaustive comparison and costly computer processing operations, such as OCR and deconstruction of symbols, are needed only when higher-level and less resource intensive analyses fail to provide a determinative match in the ORGOR 124. In some embodiments, the system 100 supports autonomous or application-driven reinforcement learning and creates deep learning datasets for use in training operations (see FIG. 2 and corresponding description).

The system 100 includes an ORG classifier service 106, an object detection orchestrator 108, internal object detection services 110, external object detection services 112, an ORG synthesizer 114, an ORG symbol generator 116, an ORG validator 118, an ORG matcher 122, the ORGOR 124, and an ORG adjustment/correction log 126. As described in the following, these components interact to provide universal object recognition and identification and a resultant classification of an input BLOB 102 based on efficient macro-level identification of objects detected in the BLOB 102.

The BLOB 102 is a binary large object, which may be any form of digital media or unstructured data. This includes, but is not limited to, image files (e.g., JPEG, PNG, TIFF, GIF, BMP), scanned documents, office documents (e.g., .docx, .pptx, .xlsx), Portable Document Format (PDF) files, audio files, video files, and other complex binary data structures. The system 100 is designed to be agnostic to the file format, as it analyzes the internal structure rather than relying on file extensions or metadata. For example, a BLOB 102 could be a PDF generated from a text-and-vector source, such as a word processing document, or a PDF that is merely a container for a single raster image, such as a scanned photograph.

The ORG classifier service 106 serves as the primary orchestrator of system services and provides an endpoint for client applications 104. Client applications 104, which may include document management systems, robotic process automation (RPA) tools, data ingestion pipelines, or the like, submit one or more BLOBs 102 to the ORG classifier service 106 for identification, recognition, and classification. Based on the classification results returned from other system components, the ORG classifier service 106 determines the appropriate processing, analysis, ingestion, extraction, transmission, or disposition rules to apply to the BLOB 102. Upon processing, the ORG classifier service 106 returns an ORG-compliant statement that uniquely describes the BLOB 102, a corresponding "friendly name" for the classified BLOB 102 (for example, "Purchase Order," "Insurance Claim Form," or "Driver's License"), and a confidence score. The confidence score generally indicates an estimated probability that the ORG-compliant statement and "friendly name" were identified correctly.

The object detection orchestrator 108 receives the BLOB 102 and controls a variety of object detection services 110, 112 to identify SubObjects, also simply referred to as "objects", within the BLOB 102. A technological improvement provided by the object detection orchestrator 108 is its ability to orchestrate both internal services 110 and external services 112, such as those that can be used for signature detection, contour analysis, block detection, and the like, without regard to the underlying technical mechanics of these services 110, 112. The object detection orchestrator 108 may intelligently chain and iterate the outputs of these specialized services 110, 112 to build a comprehensive SubObject presence list with associated attributes. If confidence levels from an initial analysis are below a defined threshold, the object detection orchestrator 108 may iterate or compare results across different services 110, 112 to refine accuracy. The object detection orchestrator 108 communicates the SubObject presence list to the ORG synthesizer 114 and can dynamically respond to requests for additional information (RFAIs) from the ORG synthesizer 114, for example, by invoking further analysis to provide the necessary detail for creating an ORG-compliant statement, as described below.

The internal and external services 110, 112 (also referred to as utilities) may include a range of AI-based, heuristic, and hybrid AI/heuristic algorithms and tools for detecting and characterizing SubObjects within a BLOB 102. Internal services 110 may comprise proprietary or bespoke algorithms developed specifically for the system 100, offering a high degree of control and optimization. In contrast, external services 112 typically refer to third-party APIs or commercially available software tools that provide specialized object detection capabilities. The system's architecture is designed to be agnostic to the source, allowing it to flexibly orchestrate both types of services.

These services 110, 112 can be specialized for different data modalities. For instance, certain services 110, 112 may be specialized for document and image analysis. For visual data, services 110, 112 may include AI-based methods like Convolutional Neural Networks (CNNs) for general object detection (e.g., identifying logos, faces, or signatures), and Recurrent Neural Networks (RNNs) for text recognition (OCR). Heuristic algorithms may also be employed, such as contour detection for isolating shapes and page segments, Hough transforms for finding lines, and template matching for locating known symbols or forms. Hybrid approaches could use a CNN to identify a region of interest, followed by a heuristic algorithm to analyze its geometric properties, such as aspect ratio or relative position. Certain services 110, 112 may be specialized for audio and video data analysis. For audio BLOBs, AI utilities can use speech-to-text models to transcribe spoken words and speaker diarization models to distinguish between different speakers. Heuristic methods can include signal processing techniques to detect periods of silence, measure volume levels, or identify specific frequencies, such as dual-tone multi-frequency (DTMF) signals from a telephone keypad. Certain services 110, 112 may be specialized for video data analysis. For video data, utilities may combine techniques from image and audio analysis. Object tracking algorithms can follow specific items or people across frames. Scene detection algorithms can identify cuts or transitions between different camera shots. AI models can be used for action recognition (e.g., identifying a person walking or waving), while heuristic methods can be used to detect motion in specific regions of the frame or to identify abrupt changes in the video content.

Overall, these services 110, 112 are configured to detect one or more SubObjects within the BLOB 102. For each detected SubObject, the services 110, 112 may determine its data coordinates, which may correspond to the data blocks or portions of data in the BLOB 102 that represent the SubObject's spatial and/or temporal location in the media or other data encoded by the BLOB 102. Subsequently, for each detected SubObject, the services 110, 112 may determine attributes by applying appropriate object characterization algorithms, like those described above, only to the portion of the BLOB 102 defined by the SubObject's data coordinates, rather than applying the algorithms to the entire BLOB 102. This targeted analysis significantly reduces computational expense. For image data, these algorithms may analyze properties such as color, shape, or contour within the specified coordinates to identify a known object or object type (e.g., a logo or a signature block). For textual data, an algorithm may extract text from the specified coordinates and match it against known patterns for a title, header, or signature. For audio or video data, the services may analyze acoustic properties at specific temporal coordinates to identify known sounds or speech patterns. Similarly, for video, an algorithm can analyze image properties at specific spatial (x, y) and temporal (t) coordinates to identify object types like watermarks, persons, or vehicles.

To summarize the above, for each detected SubObject within the BLOB 102, the system 100 may identify a subset of data that encodes a digital representation of the SubObject as it would appear in an analog presentation, with the subset defined by specific spatial and/or temporal coordinates within the BLOB 102. The system 100 may then apply the machine-implemented object characterization algorithm provided by services 110, 112 only to this identified subset of data, rather than to the entire BLOB 102, to determine attributes of the detected SubObject. This targeted approach ensures efficient and accurate extraction of object attributes while minimizing computational overhead.

The ORG synthesizer 114 encapsulates the formal grammar processing components of the system 100. The ORG synthesizer 114 parses the SubObject list from the object detection orchestrator 108, requests compliant ORG symbols for each SubObject from the ORG symbol generator 116, and synthesizes the symbols into an ORG-compliant statement. This statement is then validated by the ORG validator 118 against the rules in the ORG formal grammar definition 120. The ORG symbol generator 116 may request additional information (RFAI) from the ORG synthesizer 114 to further define symbols by inferring additional attributes.

As part of the process, the system 100 may determine an inferred identity for each detected SubObject and a characteristic description of the SubObject based on the coordinates and/or the attributes of the object. The inferred identity may correspond to the type or function of the object (such as 'signature block,' 'header,' or 'graphic marker'), while the characteristic description may include details such as size, position, orientation, or other relevant attributes. The system 100 may generate a text string for each SubObject, indicating the inferred identity (e.g., as represented by the symbols selected by the ORG symbol generator 116) and at least a portion of the characteristic description. These generated text strings are then arranged according to the notation of the ORG, as described further below, forming a hierarchical and tokenized structure that supports efficient parsing and comparison to definitions in the ORGOR 124. As a result, the created ORG-compliant statement encodes the relationships and attributes of the detected SubObjects within the BLOB 102, enabling robust and verifiable classification.

The ORG formal grammar definition 120 serves as the definitive reference for the system 100 and provides the grammatical rules used by the ORG symbol generator 116 and ORG synthesizer 114 for creating new statements and by the ORG validator 118 for checking the validity of any generated or submitted statement. The ORG formal grammar definition 120 represents a shared definition that is accessible by subject matter experts, analysts, programmers, and is also structured for computer-language based utilities such as interpreters and analyzers to automate statement validation and computation.

The ORG notation used by the system 100 and in the ORG formal grammar definition 120 may be, for example, Backus-Naur Form (BNF) or a similar ORG. BNF is a formal notation for expressing the grammar of a language using terminals (literal characters), non-terminals (variables), and production rules (which define how non-terminals expand). Other object recognition grammars may be used, such as Extended Backus-Naur Form (EBNF), Augmented Backus-Naur Form (ABNF), and graphical representations like Syntax Diagrams. This disclosure contemplates any appropriate formal grammar being used, whether existing today or developed in the future, that is compatible with the disclosed systems and methods.

The ORG may be abstracted into high-level pattern-based SubObject Elements such as Header, Body, Footer, Contour, GraphicBlock, Nameplate, TextBlock, and ElementBlock. Each of these elements may be assigned a valid set of attributes (specified in the notation), which further define the Element. The ORG may be extensible to add additional high-level pattern-based SubObject Elements and additional Attributes. An example ORG formal grammar definition 120 is provided in the following:

---

<Opt Object> ::= “” | <Object>

<Opt Text Literal Attrib> ::== “” | <Text Literal Attrib> | <Opt Text Literal Attrib> <Text Literal Attrib>

<Compsize> ::== “XL” | “L” | “M” | “S” | “Mixed”

<Text Literal Attrib> ::= “”| <Bold> Boolean | <Italic> Boolean | <Vertical> Boolean | <Compsize> <Opt Layer> INTEGER <Text Literal> ::== <LITERAL DYNAMIC LOOKUP> <Opt Text Literal Attrib>

<Font Style> ::== “italic” | “bold” | “bolditalc” | “mixed” <Compsize>

<Opt Font Style> ::== “” | <Font Style> | Opt Font Style <Font Style>

<Opt Text Block Attrib> ::== “”| <Text Block Attrib> | <Opt Text Block Attrib> <Text Block Attrib>

<Text Block Attrib> ::== “” | <%Height> INTEGER | <%HeightPlusMinus> INTEGER | <%Width> INTEGER | <%WidthPlusMinus> INTEGER | <%ALPHA> INTEGER | <%ALPHAPlusMinus> INTEGER | <Opt Font Style> | <Opt Layer> INTEGER <Opt Text Block> ::== “” | <Text Block> | <Opt Text Block>

<Text Block> ::== “Prose” | “Numbered Items” | “Hybrid” <Text Block Attrib>

<Opt Nameplate> ::== “”| “NAMEPLATE:” “Form" <Text Literal> | “NAMEPLATE:”“FORM” <Text Literal> | “NAMEPLATE:” <Text Literal>

<Opt Graphic Block Attrib> “” | <Graphic Block Attrib> | <Opt Graphic Block Attrib> <Graphic Block Attrib>

<Graphic Block Attrib> ::== <%Height> INTEGER | <%HeightPlusMinus> INTEGER | <%Width> INTEGER | <%WidthPlusMinus> INTEGER | <%ALPHA> INTEGER | <%ALPHAPlusMinus> INTEGER | <Opt Layer> INTEGER <Machine Read Type Attrib> ::== <LITERAL DYNAMIC LOOKUP> “QR” | “UPC”|”RFID”,”MICR”

<Opt Machine Read Type Attrib> = “”| <Machine Read Type Attrib> <Opt Machine Read -continued

```
Type Attrib>
<Opt Graphic Block> ::== “” | <Graphic Block> | <Opt Graphic Block>
<Graphic Block> ::== “Marker” | “Rectangle” | “Square” | “Circle” | “Triangle” |
“Irregular” <Opt Graphic Block Attrib> <Opt Machine Read Type Attrib>
<Page Header Element> ::== <Opt Graphic Block> | <Opt Text Block> | <Opt Nameplate>
<Opt Page Header Element> ::== “” | <Page Header Element>|<Page Header Element>
<Opt Page Header Element”
<Opt Page Header ::== “” | “PAGEHEAD:” <Page Header Element> <Opt Page Header
Element>
<Page Footer Element> ::== <Opt Graphic Block> | <Opt Text Block> | <Opt Nameplate>
<Opt Page Footer Element> ::== “” | <Page Footer Element> <Opt Page Footer Element>
<Opt Page Footer> ::== “” | “PAGEFOOT:” <Page Footer Element> <Opt Page Footer
Element>
<Opt NumberedItemsTF> ::== “”| “NumberedItemsTrue” | “NumberedItemsFalse”
<Labels> ::== “Above”| “Below” | “Left” | “Right” | “Centered”
<Opt Labels> ::== “” | “LABELS:” <Labels> <Opt Labels>
<ElementContainer>::== “Bubble”, “SelectionElement”, “Line”, “Box”, “VectorBox”
<Opt ElementContainer> ::== “” | “ELEMENTCONTAINER:” <ElementContainer>
<Opt Element Container>
<Element Block> ::==“Justified” | “Columnar” | “Matrix” <Opt Element Block> <Opt
NumberedItemsTF> <Opt Labels> <Opt ElementContainer>
<Body Component> ::== “” | <Graphic Block> | < Text Block> | <Element Block >
<Opt Body Component ::== “” | “BODY:” <Body Component> <Opt Body Component>
<Body> ::== <Opt Body Component>
<Contour Attrib> ::== STRING <INTEGER DYNAMIC LOOKUP>
<Opt Contour Attrib> ::== “” | <Contour Attrib> <Opt Contour Attrib>
<Contour Hash Algorithm Gran> ::== “CONTOURHASHALGOGRAN:” X (INTEGER)
Y(INTEGER)
<Contour Hash Algorithm> ::== “CONTOURHASHALGO:” <LITERAL DYNAMIC
LOOKUP>
<Contour Map> ::== “CONTOURMAP:” VECTOR
<Contour> ::== <Contour Map> <Contour Hash Algorithm> <Opt Contour Hash
Algorithm Gran> <Opt Contour Attrib>
<Opt Contour> ::== “”| “CONT:” <Contour>
<Form Page> ::= <Opt Contour> <Opt Page Header> <Opt Body Component> <Opt
Page Footer>
<Opt Form Page> ::== “” | “FORMPAGE:” Identifier “:” <Form Page> <Opt Form Page>
<Object> ::== <Page> <Opt Page> <Opt Object>
```

This example formal grammar definition 120 is presented in a BNF-like formal notation which includes terms inside angle brackets, such as <Opt Object>, <Compsize>, or <Text Literal Attrib>, which may be referred to as non-terminals. Non-terminals represent abstract syntactic categories or variables that can be further expanded or replaced by other non-terminals or terminals according to the grammar rules. The notation also includes terms not enclosed in angle brackets and usually in quotes, such as “XL”, “L”, “M”, “S”, or “Mixed”, which may be referred to as terminals. Terminals are the actual literal values or tokens that appear in the final output or representation. The notation includes the symbol ::== (sometimes written as ::= or :=), which may be used to define a production rule. This symbol may mean “is defined as” or “can be replaced by.” The left side is the non-terminal being defined, while the right side lists the possible expansions. In the example notation, the vertical bar “|” may be used to indicate alternatives or choices. For example, <Compsize>::==“XL”|“L”|“M”|“S-”|“Mixed” means that <Compsize> can be replaced by any one of those five terminal values. In this example notation, the use of “ ” (empty string) as an alternative means that the element is optional, such that it may be omitted. For example, <Opt Object>::==“ ”|<Object> means that <Opt Object> can be either nothing (empty) or an <Object>. Repetition may be handled by recursive definitions, such as <Opt Text Literal Attrib>::==“ ”|<Text Literal Attrib>|<Opt Text Literal Attrib> <Text Literal Attrib>, which allows for zero or more <Text Literal Attrib> elements. Terms like “Boolean” or “INTEGER” indicate the expected data type for that part of the rule. For example, <Bold> Boolean means that the <Bold> attribute expects a Boolean value (true/false). <LITERAL DYNAMIC LOOKUP> is a placeholder indicating that a literal value will be dynamically looked up or inserted at that position. The recursive structure of the rules (where non-terminals are defined in terms of other non-terminals) may allow for hierarchical and compositional representations. This approach supports complex, nested object descriptions. The preceding is a description of one example notation for storing the formal grammar definition 120. However, the notation may be modified as appropriate, and other notations may be employed as long as the methods described in this disclosure can still be performed.

In its overall operation with the ORG symbol generator 116 and ORG validator 118, the ORG synthesizer 114 may generate, based on the list of SubObjects and their attributes, a representation of the BLOB 102 that is compliant with the ORG. This representation generally encodes the type of detected SubObjects, their spatial relationships (e.g., relative positions), and/or their logical relationships (e.g., a signature overlaying a signature line). This representation is a statement in the ORG-compliant notation, an example of which is described in detail above.

The ORG matcher 122 receives an ORG-compliant statement from the ORG synthesizer 114 and compares this representation against a repository of predefined object definitions stored in the ORGOR 124. The ORG matcher 122 identifies whether an exact or sufficient match exists by accessing records in the ORGOR 124. The ORG matcher 122 provides a confidence score indicating the level of certainty. In cases of ambiguity or insufficient detail for a match, the ORG matcher 122 can submit a RFAI to the object detection orchestrator 108, which may trigger more computationally intensive analysis (e.g., OCR and/or hash comparisons) to refine the object's attributes. Upon successful matching, the ORG matcher 122 returns the corresponding "friendly name" for the BLOB 102. As described in greater detail with respect to FIG. 2, the ORG matcher 122 may also participate in reinforcement learning by processing adjustments or corrections logged via the ORG adjustment/correction log 126 when incorrect classifications are identified, thereby improving future matching accuracy.

In operation, the ORG matcher 122 may determine whether the generated ORG-compliant representation matches a predefined representation for a known class of BLOBs by applying a machine-implemented comparison algorithm. This algorithm compares the generated representation to a plurality of indexed ORG-compliant representations of known BLOB types stored in the ORGOR 124. Based on the results of this comparison, the ORG matcher 122 determines whether a match exists and generates a confidence score indicating the probability that the generated representation corresponds to a known class of BLOBs. The confidence score may be used to indicate the level of certainty in the classification and to trigger further analysis or review if the score falls below a predefined threshold, as described further below.

In some embodiments, in addition to or in alternative to providing a "friendly name" to the client application 104, the system 100 may embed classification information in the BLOB 102 or otherwise associate the BLOB 102 with the classification information. For example, the system 100 may embed metadata in the BLOB indicating the "friendly name" in a human and/or machine-readable format. In some embodiments, the system 100 may trigger an automated action based on the classification achieved by determining the "friendly name" for the BLOB 102. For example, the system 100 may automatically determine how the BLOB 102 should be stored (e.g., in a database for information corresponding to the determined "friendly name" and/or with certain encryption and/or security constraints for the information) or where the BLOB 102 should be sent (e.g., to known recipients of information corresponding to the determined "friendly name"). For instance, if a BLOB 102 is determined to be a tax form having private and personal identifiable information, the BLOB 102 may be automatically tagged with metadata indicating the type of tax form and automatically stored in a secure (e.g., encrypted) manner. If appropriate, the resulting tagged and secured BLOB may then be transmitted to an appropriate recipient of the tax form. A notification may be automatically generated to inform the sender and/or recipient that the form was stored and/or transmitted, as appropriate.

In some embodiments, if the system 100 determines that a generated ORG-compliant representation for a BLOB 102 does not match any predefined representation for a known class of BLOBs in the ORGOR 124, the system 100 may automatically trigger a full machine-implemented analysis of the entire BLOB 102 (e.g., using an advanced model 144 of FIG. 2). This escalation may involve applying more comprehensive algorithms, such as full-document OCR, hash comparisons, or other resource-intensive methods, to the entirety of the BLOB 102, rather than limiting analysis to detected SubObjects or regions of interest in the BLOB 102, as was performed by services 110, 112. This approach ensures that a BLOB 102 with previously unseen or ambiguous structure receives thorough analysis, supporting the identification of new object types and the ongoing refinement of the system 100 and its operation.

The ORGOR 124 is any persistent data store, such as a relational database, a key-value store, or an indexed file system, structured with indexed object representations to support fast retrieval of a BLOB's friendly name using its ORG-compliant representation. Since ORG-compliant representations may follow a modified prefix property, uniqueness may be derived as soon as a unique prefix is identified during matching and lookups by the ORG matcher 122. Retrievals may occur efficiently, on the order of $\log_2 N$, where Nis the number of object definitions stored in the ORGOR 124. As such, even as the number of stored object definitions (N) grows large, the retrieval process can remain efficient due to the use of indexed data structures and the ability to determine uniqueness as soon as a unique prefix is identified during matching and lookups. This allows for rapid classification and matching, supporting scalability and high performance in environments with large and growing datasets. Furthermore, entries may support n-level escalation or refinement, such that additional object detection information is accessed, computed, and matched only when needed to make a match determinative. Once a fully unique statement is reached, the resulting friendly name is the closest match to the input-determined ORG compliant representation.

In an example operation of the system 100, the client application 104 initiates the process of classifying a BLOB 102 by calling the ORG classifier service 106 and submitting the BLOB 102 (or multiple BLOBs 102) as a payload. The classifier service 106 separates this payload into singleton objects if necessary. The classifier service 106 then calls the object detection orchestrator 108 to begin analysis using any appropriate services 110, 112. The classifier service 106 is ultimately responsible for returning the final results to the client application 104 as an ORG-compliant statement uniquely representing the BLOB, its corresponding user-friendly "friendly name," and, optionally, a confidence score.

The object detection orchestrator 108 executes a series of lightweight, structure-first analyses using a library of internal services 110 and/or external detection service 112 (e.g., for signature detection, contour detection, block detection, etc.). This structure-first approach minimizes computationally expensive operations like OCR. The object detection orchestrator 108 organizes the results into a SubObject presence list with associated attributes and calls the ORG synthesizer 114. While the ORG synthesizer 114 performs its functions, the object detection orchestrator 108 manages a responsive feedback loop, handling RFAIs from the ORG synthesizer 114 by triggering further analysis by the services 110, 112 to refine SubObject attributes as needed.

Upon receiving singleton SubObjects and their attributes from the ORG synthesizer 114, the ORG symbol generator 116 transforms this information by mapping these SubObjects into ORG-compliant tokens, or "symbols," and creating corresponding attribute tokens. If more detail is required to create a valid symbol, the ORG symbol generator 116 can issue an RFAI back to the ORG synthesizer 114. The resulting ORG compliant symbol is then returned to the ORG synthesizer 114.

The ORG synthesizer 114 uses the received symbols to generate an ORG-compliant statement. The ORG validator 118 receives this synthesized statement and ensures the statement's structural integrity and correctness by validating it against the rules defined in the ORG formal grammar definition 120. This provides a verifiable, logic-based classification, removing the "black box" problem of conventional AI.

Finally, the ORG matcher 122 receives the validated ORG compliant statement. The ORG matcher 122 accesses the ORGOR 124 to find a matching object classification. If a determinative match is not found, the ORG matcher 122 can issue an RFAI to the object detection orchestrator 108 for more detailed analysis by the services 110, 112. The ORG matcher 122 then provides the final "friendly name" for the BLOB and optionally a confidence score indicative of an estimated probability that the friendly name is correct. The ORG matcher 122 may also participates in reinforcement learning, as described above (see FIG. 2), by incorporating corrections from the ORG adjustment/correction log 126, enabling autonomous system improvement with minimal training data.

In some embodiments, the system 100 may compare the generated confidence score from the ORG matcher 122 to a predefined threshold. If the confidence score is determined to be below the threshold level, the system 100 may automatically trigger a review of the BLOB 102. This review may involve escalating the analysis to more computationally intensive algorithms (see advanced models 144 of FIG. 2), such as full-document OCR or hash comparisons, or may prompt a human or automated agent to review the classification result. This mechanism ensures that BLOBs with uncertain or ambiguous classifications receive additional scrutiny, thereby improving overall classification accuracy and reliability while avoiding use of computationally expensive algorithms until absolutely necessary to provide reliable results.

When the "friendly name" is received by the client application 104, the client application 104 (or a user of the client application 104) may determine that an adjustment is needed to the information provided by the system 100. For example, the friendly name may be incorrect for the BLOB 102 that was submitted. This determination may be made by a human user or by an algorithm executed at the client application 104. If this occurs, a correction or adjustment may be made and submitted to the ORG adjustment/correction log 126. This information may then used to retrain the system.

FIG. 2 illustrates an example operation of the system 100 during training the system 100 employs a training executive 140, which manages training epochs where training data 142 containing BLOBs with known friendly names are processed by the system 100 to create definition entries in the ORGOR 124 with the ORG-compliant description of the BLOB paired with its friendly name for indexing and retrieval. For example, upon receiving training data 142, which consists of BLOBs paired with their known friendly names, the training executive 140 may initiate the process by passing each BLOB to the object detection orchestrator 108. The object detection orchestrator 108 applies a suite of internal and external object detection utilities to identify and extract SubObjects and their associated attributes from the BLOB, generating a comprehensive SubObject presence list. This list, along with the detected attributes, is then forwarded to the ORG synthesizer 114, which parses the SubObject information and requests ORG-compliant symbol representations from the ORG symbol generator 116. The symbol generator 116 constructs these symbols in accordance with the formal grammar rules and, if necessary, requests additional detail via RFAIs to ensure completeness. The synthesized ORG-compliant statement, representing the structural and attribute-based description of the BLOB, is then validated by the ORG validator 118 for grammatical correctness. Once validated, the training executive 140 pairs the ORG-compliant statement with the known friendly name and stores this entry in the ORGOR 124. This process ensures that the ORGOR 124 is continually updated with accurate, grammar-compliant definitions, enabling efficient and reliable future matching and retrieval operations.

The training executive 140 may also manage reinforcement learning of misidentified and administrator-corrected entries in the ORGOR 124 which have been stored in the ORG adjustment/correction log 126, as described above. In this case, the ORG adjustment/correction log 126 may act as a deep-learning information store for post-training and alternate deep learning training utilizing trusted corrections from applications or human reviewers. The training executive 140 may execute a reinforcement learning loop to systematically review entries in the ORG adjustment/correction log 126, which capture instances where the ORG matcher 122 produced a misidentification or where a human or application-driven correction has been submitted. For each such entry, the training executive 140 may initiate a retraining or update cycle, leveraging the corrected ORG-compliant statement and its associated friendly name to refine or augment the definitions stored in the ORGOR 124.

This process may involve the invocation of advanced (e.g., and computationally expensive) models 144, such as deep neural networks, large language models (LLMs), or ensemble consensus mechanisms, particularly when the correction involves ambiguous or previously unseen object structures. These advanced models 144 are used to analyze the BLOB and its corrected ORG-compliant statement in greater depth, extracting additional features or validating the correction against a broader context of known object definitions. The insights and outputs from these advanced models 144 may then be synthesized by the training executive 140 to update or create new entries in the ORGOR 124, ensuring that the ORGOR 124 evolves to reflect the most accurate and comprehensive set of object definitions. This approach enables the system 100 to autonomously improve its classification accuracy over time, adapt to new object types or structural variations, and maintain high reliability even as the diversity and complexity of input BLOBs increase.

When a correction to a classification is received, whether from a human user or an automated process, the system 100 may automatically update the indexed ORGOR 124 to incorporate the corrected ORG-compliant statement and its associated friendly name. This update ensures that, during subsequent classification operations, the system will reference the corrected entry, thereby preventing the same misclassification from occurring in the future. This process facilitates ongoing improvement of classification accuracy by directly integrating corrections into the repository used for matching and classification decisions.

In some embodiments, when a new ORG-compliant representation is generated, either from new training data or as a result of a correction, the training executive 140 may perform a machine-implemented comparison between the new representation and preexisting representations stored in the ORGOR 124. This comparison may utilize a threshold-based approach, where similarity is determined by the number of matching parsed portions between the new and existing representations, or may employ machine learning-based similarity metrics. If the new representation is determined to be similar to a preexisting representation, the system may link the new entry to the similar preexisting entry via an index pointer. This linkage can be used to mark the representations as belonging to the same type or to flag them for further review by a human or AI agent, thereby supporting efficient management of object definitions and facilitating ongoing refinement of the classification system.

Figure 3:
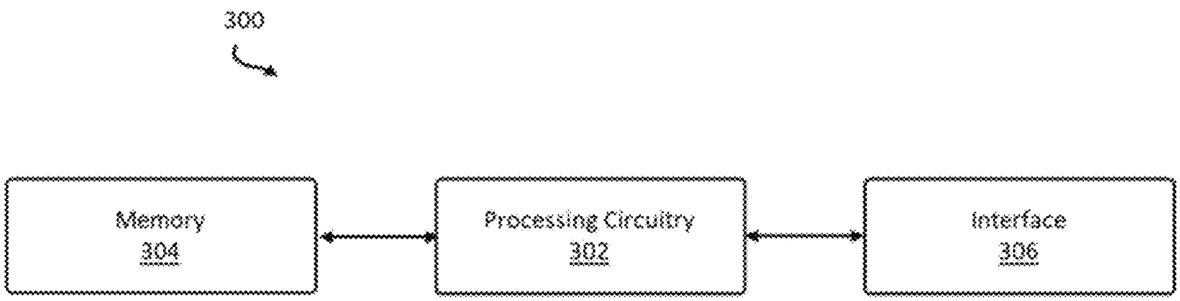
FIG. 3 is a diagram depicting exemplary processing hardware for implementing the system of FIGS. 1 and 2.

FIG. 3 illustrates an example processing device 300. The processing device 300 or a collection of processing devices 300 (e.g., arranged as one or more servers) may be employed to implement one or more of the components of the system 100 of FIG. 1. The device 300 includes processing circuitry 302, memory 304, and a communications interface 306. The processing circuitry 302 includes one or more processors. The processing circuitry 302 includes any electronic circuitry, such as state machines, one or more central processing unit (CPU) chips, logic units, cores (e.g., a multi-core processor), field-programmable gate array (FPGAs), application-specific integrated circuits (ASICs), digital signal processors (DSPs), neural processing units (NPUs), graphics processing units (GPUs), tensor processing units (TPUs), and/or the like. The processing circuitry 302 may be a programmable logic device, a microcontroller, a microprocessor, or any suitable combination of these or similar devices. The processing circuitry 302 is communicatively coupled to and in signal communication with the memory 304. The one or more processors are configured to process data and may be implemented in hardware and/or software. For example, the processing circuitry 302 may be 8-bit, 16-bit, 32-bit, 64-bit or of any other suitable architecture. The processing circuitry 302 may include an arithmetic logic unit (ALU) for performing arithmetic and logic operations, processor registers that supply operands to the ALU and store the results of ALU operations, and a control unit that fetches instructions from memory 304 and executes them by directing the coordinated operations of the ALU, registers, and other components.

The memory 304 includes any logic, instructions, code, and/or rules for implementing the functions of the system 100 of FIG. 1. The memory 304 may include one or more disks, tape drives, or solid-state drives to store programs when such programs are selected for execution and to store instructions and data that are read during program execution. The memory 304 may be volatile or non-volatile and may include, for example, read-only memory (ROM), random-access memory (RAM), ternary content-addressable memory (TCAM), dynamic random-access memory (DRAM), and static random-access memory (SRAM).

The communications interface 306 is configured to enable wired and/or wireless communications between other devices or systems. For example, the communications interface 306 may include a network interface, such as a Wi-Fi interface, a local area network (LAN) interface (e.g., an Ethernet interface), a wide area network (WAN) interface, a modem, a switch, or a router. The communications interface 306 may also include a hardware interface, such as a Universal Serial Bus (USB) interface, a parallel interface, and the like. The processing circuitry 302 may send and receive data using the communications interface 306, which may be configured to use any suitable type of communication protocol.

It should be understood that, although the present disclosure describes the classification of a binary large object (BLOB) as a primary example, the methods and systems disclosed herein are not limited to BLOBs alone. The same techniques may be used or readily adapted to classify other forms of data, including but not limited to structured data records, text streams, tabular datasets, sensor data, or serialized data objects. For instance, the described object recognition grammar and macro-level identification processes may be applied to classify a stream of log entries, a collection of database records, or even real-time telemetry data, provided that such data can be represented in a manner compatible with the system's object detection and grammar-based analysis. Accordingly, references to the classification of a BLOB throughout this disclosure should be understood to encompass, where appropriate, the classification of other data types using the same or analogous approaches.

As used herein, a "binary large object" (BLOB) refers to any digital data file or data structure that encapsulates a substantial quantity of binary-encoded information, typically representing complex, non-textual content such as images, scanned documents, audio files, video files, or other multimedia and compound data types. BLOBs may also include files that contain embedded objects, vector graphics, or a combination of structured and unstructured data, and are often stored or transmitted in formats that are opaque to conventional text-based processing systems. In the context of this disclosure, BLOBs are the primary units of analysis for recognition, identification, and classification, and may originate from a variety of sources, including but not limited to, AI-generated or AI-processed media, digitized records, or sensor outputs. The term encompasses both static and dynamic data objects, regardless of their file extension, encoding scheme, or method of generation.

As used herein, an "object" or "SubObject" refers to any discrete, identifiable component or element within a BLOB that can be recognized, classified, and described according to its structural, spatial, and/or logical attributes. An object may include, for example, a graphic block, text block, contour, nameplate, header, footer, or any other subcomponent that exhibits a distinct presence or function within the BLOB. Objects may be defined not solely by their pixel or data content, but by their relative positions, comparative sizes, relationships to other elements, and other attributes as specified by the Object Recognition Grammar (ORG). Objects may include both high-level constructs, such as a form page or document section, and lower-level elements, such as a signature, barcode, or graphical marker.

As used herein, a "representation" or "grammar-compliant representation" refers to a structured, machine-readable description of one or more objects detected within a BLOB, wherein each object is defined according to the rules and syntax of the Object Recognition Grammar (ORG). Such a representation encodes not only the presence and type of each object, but also its spatial coordinates, geometric dimensions, logical relationships to other objects, and any relevant attributes (such as size, orientation, or function) as specified by the ORG. The representation is typically expressed as a sequence of tokens or a text-based statement that conforms to the object recognition grammar, enabling deterministic parsing, validation, and efficient comparison against a repository of known object definitions. This approach allows both human and machine agents to interpret, verify, and classify objects based on their structural and relational properties, rather than relying solely on low-level data or pixel content. A grammar-compliant representation thus serves as a digital blueprint of the BLOB's constituent elements, supporting robust identification, classification, and auditability across diverse media types.

As used herein, "object recognition grammar" (ORG) refers to a conceptual framework and computational modeling approach in computer vision that uses formal grammars to represent objects in a hierarchical and compositional manner. The ORG defines objects in terms of simpler components and their spatial relationships, allowing systems to handle variations in appearance, structure, and occlusion. For example, the ORG may refer to a formal grammar comprising a set of syntactic and semantic rules for representing detected objects and their relationships within a BLOB. The ORG defines a hierarchical and tokenized structure that encodes: (1) object types (e.g., text field, image block, barcode), (2) spatial relationships (e.g., above, below, left-of, right-of), and (3) logical relationships (e.g., belongs to header, part of section). The ORG enables both machine-readable and human-readable representations of object structures, supporting deterministic classification, efficient comparison, and auditability. This approach enables both human and machine agents to interpret, verify, and classify objects based on their structural and relational properties, rather than relying solely on low-level data or pixel content. The ORG provides a robust "digital blueprint" for object identity, supporting efficient parsing, validation, and comparison in automated recognition and classification tasks. In some embodiments, the ORG representation is stored as a tree or graph structure, where nodes correspond to objects and edges represent spatial or logical relationships.

As used herein, an "indexed data repository" refers to a searchable database or data structure that stores grammar-compliant representations of known BLOB types. The repository is organized to enable rapid matching and classification by supporting efficient retrieval and comparison of these representations against newly generated representations from input BLOBs. The indexed data repository may be implemented as a relational database, key-value store, or any other data structure that allows for fast lookup and matching operations based on the grammar-compliant statements generated by the system.

As used herein, a "machine-implemented algorithm" refers to any process, procedure, or set of instructions that is expressly configured to be executed by a computing device, processor, or electronic hardware, and that operates on data stored in tangible, non-transitory computer-readable media. Such algorithms are structurally integrated with the system's hardware and/or software components, including but not limited to processors, memory, data buses, and input/output interfaces, and are not capable of being performed in the human mind or by mental processes alone. A machine-implemented algorithm, as used herein, encompasses steps that require electronic data manipulation, storage, retrieval, and logical operations performed by a computer or other specialized hardware.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented using software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the methods and embodiments described herein. Thus, the operation and behavior of the systems and methods were described without reference to specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable medium includes both computer storage media and tangible storage media that facilitate transfer of a computer program from one place to another. A non-transitory processor-readable storage medium may be any available medium that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc, where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter, e.g., for applications suitable for public and private sectors. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the claims in the non-provisional application claiming priority to this provisional application.

What is claimed is:

1. A computer-implemented method, comprising, by a processor:

receiving data comprising a first binary large object;

detecting, in the first binary large object, one or more objects;

for each of the one or more detected objects, determining data coordinates within the first binary large object;

for each of the one or more detected objects, determining, by applying a machine-implemented object characterization algorithm to a portion of the first binary large object defined by the data coordinates, attributes of the detected objects without applying the machine-implemented object characterization algorithm to the entire first binary large object, wherein the machine-implemented object characterization algorithm comprises at least one of an AI-based detection algorithm, a rule-based detection algorithm, or a hybrid AI-and-rule-based detection algorithm;

generating, based on the detected objects, a representation of the first binary large object, wherein the representation is compliant with an object recognition grammar (ORG) and encodes at least one of a type of the detected objects, spatial relationships of the detected objects, and logical relationships of the detected objects;

accessing an indexed data repository storing a plurality of indexed binary large object representations and using the indexed data repository to determine whether the generated representation matches a predefined representation for a known class of binary large objects; and responsive to determining that the generated representation matches the predefined representation, classifying the first binary large object as an object from the known class of binary large objects, wherein generating the representation of the first binary large object comprises for each detected object:

determining an inferred identity and a characteristic description of the object based on the coordinates and/or the attributes of the object; and generating a text string indicating the inferred identity and at least a portion of the characteristic description of the object; and arranging the generated text strings according to the ORG, wherein the arranged text strings are hierarchical and tokenized, supporting efficient parsing and comparison.

2. The method of claim 1, wherein the first binary large object comprises an image file, a document file, an audio file, or a video file.

3. The method of claim 1, wherein detecting the objects comprises applying at least one of a machine learning model, a rule-based pattern matching algorithm, and a heuristic identification algorithm to the first binary large object to detect the objects.

4. The method of claim 1, wherein determining the data coordinates of each of the one or more detected objects comprises identifying, for the object, a subset of data of the first binary large object that encodes a digital representation of a corresponding object in an analog presentation of the data at given spatial and/or temporal coordinates.

5. The method of claim 4, wherein determining the attributes for each of the one or more detected objects comprises applying the machine-implemented object characterization algorithm only to the subset of data identified for the object without applying the machine-implemented object characterization algorithm to the entire first binary large object.

6. The method of claim 1, wherein determining whether the generated representation matches a predefined representation for a known class of binary large objects comprises:

comparing the generated representation to plurality of indexed binary large object representations in the indexed data repository using a machine-implemented comparison algorithm; and based on the comparison, determining that the known class of binary large objects matches the generated representation and a confidence score for the match.

7. The method of claim 1, further comprising:

receiving additional data comprising a second binary large object;

generating a second representation of the second binary large object, wherein the second representation is compliant with the ORG;

determining that the second generated representation does not match a predefined representation for a known class of binary large objects; and responsive to determining that the second generated representation does not match a predefined representation for a known class of binary large objects, triggering a full machine-implemented analysis of an entirety of the second binary large object.

8. The method of claim 1, further comprising determining a new predefined representation to include in the indexed data repository based on a set of training data by:

receiving the set of training data, the set of training data comprising a new binary large object and a known identity of the new binary large object;

determining a new ORG-compliant representation for the new binary large object; and storing and indexing the new ORG-compliant representation and the known identity in the indexed data repository.

9. The method of claim 8, further comprising:

determining, based on a machine-implemented comparison of the new ORG-compliant representation to preexisting representations in the indexed data repository, that the new representation is similar to a preexisting representation; and linking via an index pointer, the new representation to the similar preexisting representation.

10. The method of claim 1, further comprising:

generating a confidence score indicating a probability that the first binary large object was classified correctly as the object from the known class of binary large objects; and responsive to determining the confidence score is below a threshold level, triggering review of the first binary large object.

11. The method of claim 1, further comprising:

receiving a correction to a classification of the first binary large object; and using the correction to automatically update the indexed repository to prevent a future misclassification of the first binary large object as the object from the known class of binary large objects, thereby facilitating ongoing classification improvement.

12. A system comprising a memory storing instructions and a processor coupled to the memory, wherein the processor is configured to:

receive data comprising a first binary large object;

detect, in the first binary large object, one or more objects;

for each of the one or more detected objects, determine data coordinates within the first binary large object;

for each of the one or more detected objects, determine, by applying a machine-implemented object characterization algorithm to a portion of the first binary large object defined by the data coordinates, attributes of the detected objects without applying the machine-implemented object characterization algorithm to the entire first binary large object;

generate, based on the detected objects, a representation of the first binary large object, wherein the representation is compliant with an object recognition grammar (ORG) and encodes at least one of a type of the detected objects, spatial relationships of the detected objects, and logical relationships of the detected objects;

access an indexed data repository storing a plurality of indexed binary large object representations and use the indexed data repository to determine whether the generated representation matches a predefined representation for a known class of binary large objects; and responsive to determining that the generated representation matches the predefined representation, classify the first binary large object as an object from the known class of binary large objects, wherein the processor is configured to generate the representation of the first binary large object by, for each detected object:

determining an inferred identity and a characteristic description of the object based on the coordinates and/or the attributes of the object; and generating a text string indicating the inferred identity and at least a portion of the characteristic description of the object; and arranging the generated text strings according to the ORG, wherein the arranged text strings are hierarchical and tokenized, supporting efficient parsing and comparison.

13. The system of claim 12, wherein the first binary large object comprises an image file, a document file, an audio file, or a video file.

14. The system of claim 12, wherein the processor is configured to detect the objects by applying at least one of a machine learning model, a rule-based pattern matching algorithm, and a heuristic identification algorithm to the first binary large object to detect the objects.

15. The system of claim 12, wherein the processor is configured to:

determine the data coordinates of each of the one or more detected objects by identifying, for the object, a subset of data of the first binary large object that encodes a digital representation of a corresponding object in an analog presentation of the data at given spatial and/or temporal coordinates; and determine the attributes for each of the one or more detected objects by applying the machine-implemented object characterization algorithm only to the subset of data identified for the object without applying the machine-implemented object characterization algorithm to the entire first binary large object.

16. The system of claim 12, wherein the processor is configured to determine whether the generated representation matches a predefined representation for a known class of binary large objects by:

comparing the generated representation to plurality of indexed binary large object representations in the indexed data repository using a machine-implemented comparison algorithm; and based on the comparison, determining that the known class of binary large objects matches the generated representation and a confidence score for the match.

17. The system of claim 12, wherein the processor is configured to:

receive additional data comprising a second binary large object;

generate a second representation of the second binary large object, wherein the second representation is compliant with the ORG;

determine that the second generated representation does not match a predefined representation for a known class of binary large objects; and responsive to determining that the second generated representation does not match a predefined representation for a known class of binary large objects, trigger a full machine-implemented analysis of an entirety of the second binary large object.

18. The system of claim 12, wherein the processor is configured to determine a new predefined representation to include in the indexed data repository based on a set of training data by:

receiving the set of training data, the set of training data comprising a new binary large object and a known identity of the new binary large object;

determining a new ORG-compliant representation for the new binary large object; and storing and indexing the new ORG-compliant representation and the known identity in the indexed data repository;

determining, based on a machine-implemented comparison of the new ORG-compliant representation to preexisting representations in the indexed data repository, that the new representation is similar to a preexisting representation; and linking via an index pointer, the new representation to the similar preexisting representation.

19. The system of claim 12, wherein the processor is configured to:

generate a confidence score indicating a probability that the first binary large object was classified correctly as the object from the known class of binary large objects; and responsive to determining the confidence score is below a threshold level, trigger review of the first binary large object.

20. The system of claim 12, wherein the processor is configured to:

receive a correction to a classification of the first binary large object; and use the correction to automatically update the indexed repository to prevent a future misclassification of the first binary large object as the object from the known class of binary large objects, thereby facilitating ongoing classification improvement.

21. A non-transitory computer-readable storage medium containing program instructions for causing a processor to perform a method comprising steps of:

by a processor:

receiving data comprising a first binary large object;

detecting, in the first binary large object, one or more objects;

for each of the one or more detected objects, determining data coordinates within the first binary large object;

for each of the one or more detected objects, determining, by applying a machine-implemented object characterization algorithm to a portion of the first binary large object defined by the data coordinates, attributes of the detected objects without applying the machine-implemented object characterization algorithm to the entire first binary large object, wherein the machine-implemented object characterization algorithm comprises at least one of an AI-based detection algorithm, a rule-based detection algorithm, or a hybrid AI-and-rule-based detection algorithm;

generating, based on the detected objects, a representation of the first binary large object, wherein the representation is compliant with an object recognition grammar (ORG) and encodes at least one of a type of the detected objects, spatial relationships of the detected objects, and logical relationships of the detected objects;

accessing an indexed data repository storing a plurality of indexed binary large object representations and using the indexed data repository to determine whether the generated representation matches a predefined representation for a known class of binary large objects; and responsive to determining that the generated representation matches the predefined representation, classifying the first binary large object as an object from the known class of binary large objects, wherein generating the representation of the first binary large object comprises for each detected object:

determining an inferred identity and a characteristic description of the object based on the coordinates and/or the attributes of the object; and generating a text string indicating the inferred identity and at least a portion of the characteristic description of the object; and arranging the generated text strings according to the ORG, wherein the arranged text strings are hierarchical and tokenized, supporting efficient parsing and comparison.

* * * * *